(12) United States Patent
Schock et al.

(10) Patent No.: US 9,401,674 B2
(45) Date of Patent: Jul. 26, 2016

(54) SINGLE-SHUNT CURRENT SENSING FOR MULTI-PHASE MOTOR

(71) Applicant: Nidec Motor Corporation, St. Louis, MO (US)

(72) Inventors: Christopher D. Schock, O'Fallon, MO (US); Prakash B. Shahi, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 78 days.

(21) Appl. No.: 14/302,228

(22) Filed: Jun. 11, 2014

(65) Prior Publication Data

US 2015/0365026 A1 Dec. 17, 2015

(51) Int. Cl.
*H02P 6/06* (2006.01)
*G05B 19/40* (2006.01)
*H02P 6/12* (2006.01)

(52) U.S. Cl.
CPC .......................... *H02P 6/12* (2013.01)

(58) Field of Classification Search
USPC ................. 318/400.13, 801, 400.02
See application file for complete search history.

(56) References Cited

U.S. PATENT DOCUMENTS

| 5,457,375 | A | * | 10/1995 | Marcinkiewicz | ....... | H02P 6/085 318/801 |
| 2009/0160248 | A1 | * | 6/2009 | Ang | ....... | B60K 6/445 307/9.1 |
| 2010/0060211 | A1 | * | 3/2010 | Hashimoto | ....... | H02P 27/08 318/400.02 |
| 2010/0072980 | A1 | * | 3/2010 | Schmitt | ....... | H02M 7/53875 324/86 |
| 2012/0068643 | A1 | * | 3/2012 | Suzuki | ....... | H02P 27/085 318/400.13 |

* cited by examiner

*Primary Examiner* — Eduardo Colon Santana
*Assistant Examiner* — Cortez Cook
(74) *Attorney, Agent, or Firm* — Hovey Williams LLP

(57) ABSTRACT

A motor controller for providing a three-phase alternating current (AC) signal to a three-phase motor. The motor controller uses current feedback from a single shunt to monitor or control the three phase AC signal. The motor controller may include a three-phase DC to AC power inverter, a single-shunt current sensor, and a processor. During individual duty cycles when two or more phase signals are too close to each other, the processor may shift one of the phase signals in time so that its leading or trailing edges are a predetermined conflict time away from each other. Then, the processor may sample current from the single-shunt current sensor to determine currents of two of the three phase signals and then calculate current of a remaining one of the three phase signals. Sample times may depend on pulse widths and shifting of the phase signals.

17 Claims, 7 Drawing Sheets

SINGLE-SHUNT CURRENT SENSING FOR MULTI-PHASE MOTOR

BACKGROUND

Three current sensors are generally used to measure currents in each phase of a three-phase motor. The cost of such sensors and related conditioning circuitry adds cost to the motor drive circuitry. The current sensors also take up additional space, making the overall size of the drive circuitry of the motor larger.

A single current sensor can be used for a three-phase motor when individual phase current information and accuracy is not required or needed. If individual phase current information is needed, more complex control methods and systems are employed with sensors for each of the individual phases. One method of using a single current sensor, as described in U.S. Pat. No. 7,193,388, involves shifting or offsetting the duty cycle times 120 degrees continuously in time and adjusting the analog/digital (A/D) trigger or sample time based on the pre-set offset or phase-shifted times. However, shifting the signals by such large amounts may cause undesired distortion which must be corrected or filtered out and/or may cause other timing conflicts, such that additional shifting other than the preset offset of 120 degrees may be required.

Accordingly, there is a need for improved methods of single-shunt current sensing.

SUMMARY

An embodiment of the present invention is a motor controller for providing a three-phase alternating current (AC) signal to a three-phase motor. The motor controller uses current feedback from a single shunt to monitor or control the three phase AC signal. The motor controller may include a three-phase DC to AC power inverter, a single-shunt current sensor, and a processor. The DC to AC power inverter may provide three separate pulse width modulated (PWM) phase signals for powering the three-phase motor. During each duty cycle, the PWM phase signals have pulses of differing widths centered at corresponding points in time. The pulses also each have a leading edge and a trailing edge. The single-shunt current sensor may be coupled in series with the inverter and may receive current from the three phase signals simultaneously.

The processor may perform a number of steps and/or execute a number of code segments for interpreting the current sensed by the single-shunt current sensor. Specifically, the processor may control pulse-width modulation of the three phase signals of the power inverter, as well as determine or track which of the three PWM phase signals is a maximum phase signal, a minimum phase signal, and a middle phase signal for any given duty cycle. The maximum phase signal has a greater pulse width than the middle and minimum phase signals, the minimum phase signal has a smaller pulse width than the maximum and middle phase signals, and the middle phase signal has a pulse width greater than that of the minimum phase signal, but less than that of the maximum phase signal.

The processor may also determine if any of the phase signals in a single duty cycle have leading or trailing edges that are less than a preselected minimum conflict time away from each other. When at least two of the phase signals have leading or trailing edges less than the preselected minimum conflict time away from each other, the processor may shift the middle phase signal in time. For example, the middle phase signal may be shifted by an amount equal to the preselected minimum conflict time minus the difference between the leading or trailing edges of two of the phase signals that are less than the preselected minimum conflict time away from each other. Then, the processor may sample current from the single-shunt current sensor at sample times a preselected delay time before the leading edge and before the trailing edge of the shifted or unshifted middle phase signal. Finally, the processor may determine currents of the maximum and middle phase signals at the sample times and calculate a current of the minimum phase signal using the determined currents of the maximum and middle phase signals. By knowing each phase's actual current, the processor can determine any necessary adjustments to apply while controlling the three-phase alternating current provided to the three-phase motor.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 6:
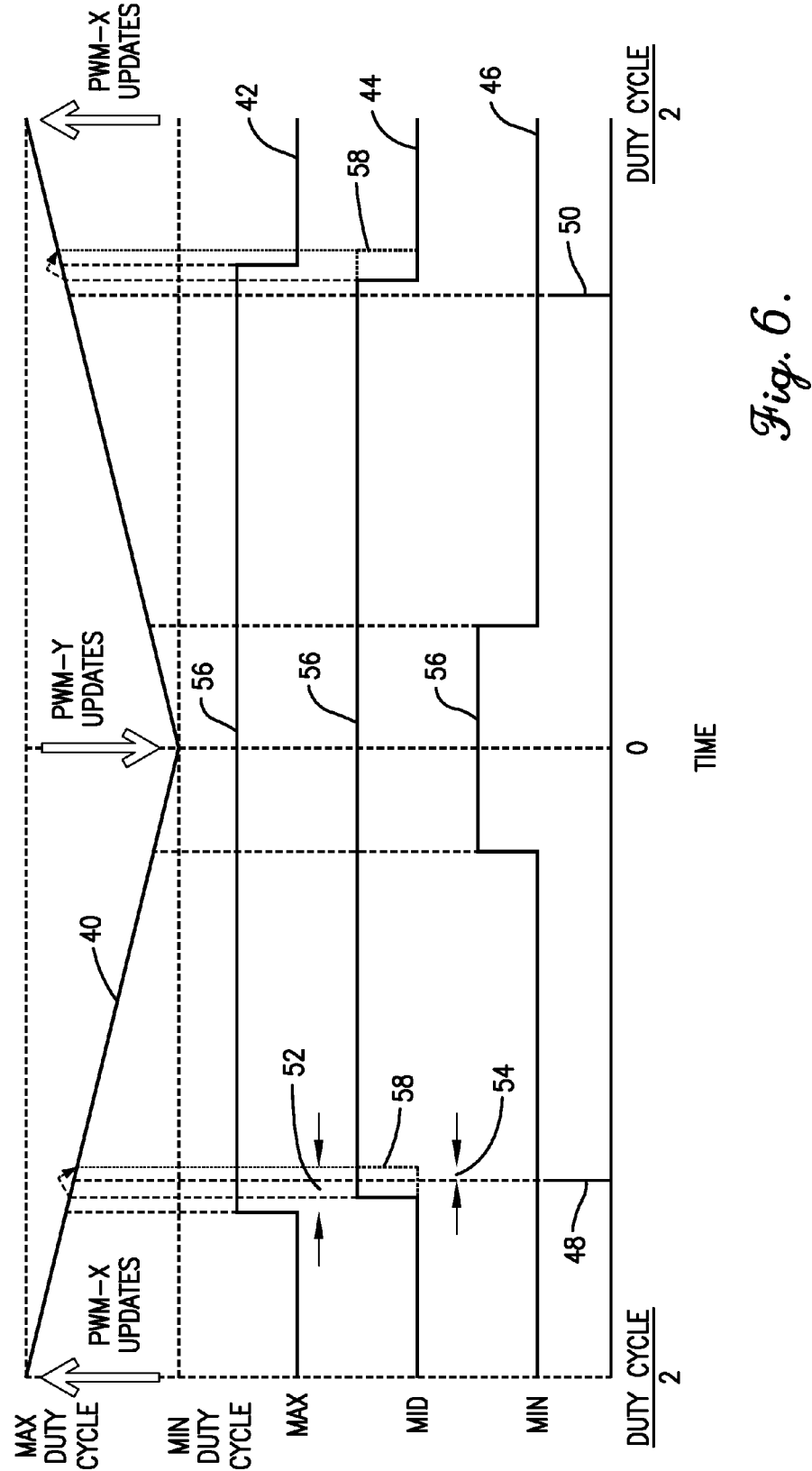
Figure 7:
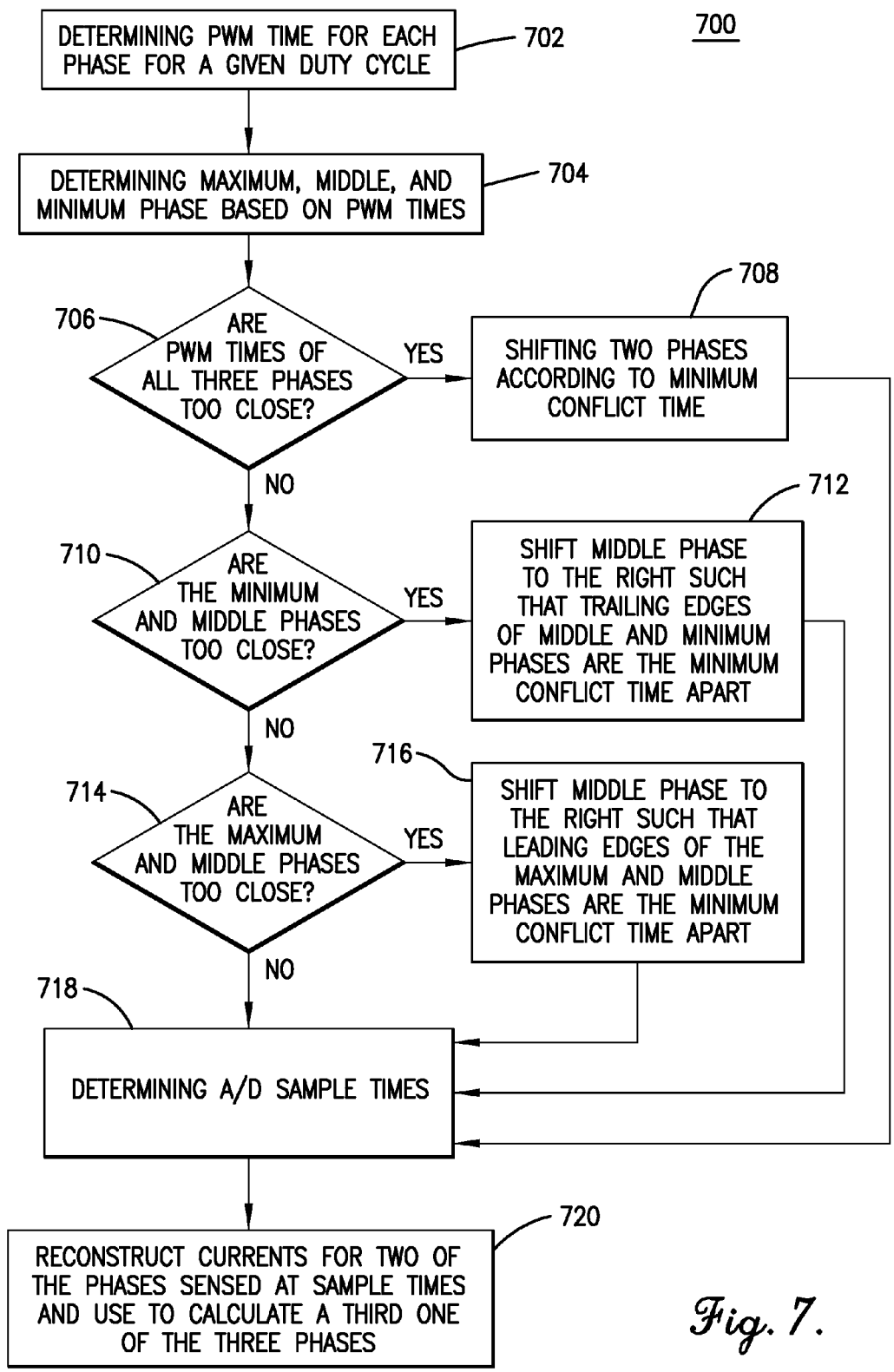

FIG. 6 is a graph illustrating a duty cycle in which pulses of maximum and middle phase signals of the AC to DC power inverter are too close together, time-wise, requiring shifting of the middle phase signal as illustrated; and FIG. 7 is a flow chart of a method for determining current of each of three phase signals using a single-shunt current sensor in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
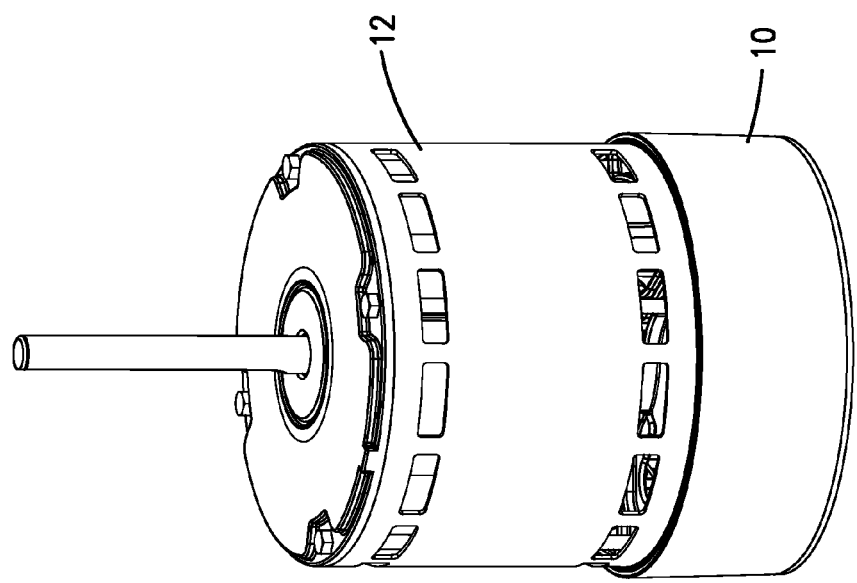
FIG. 1 is a perspective view of a three-phase motor and motor controller constructed in accordance with an embodiment of the present invention.
Figure 2:
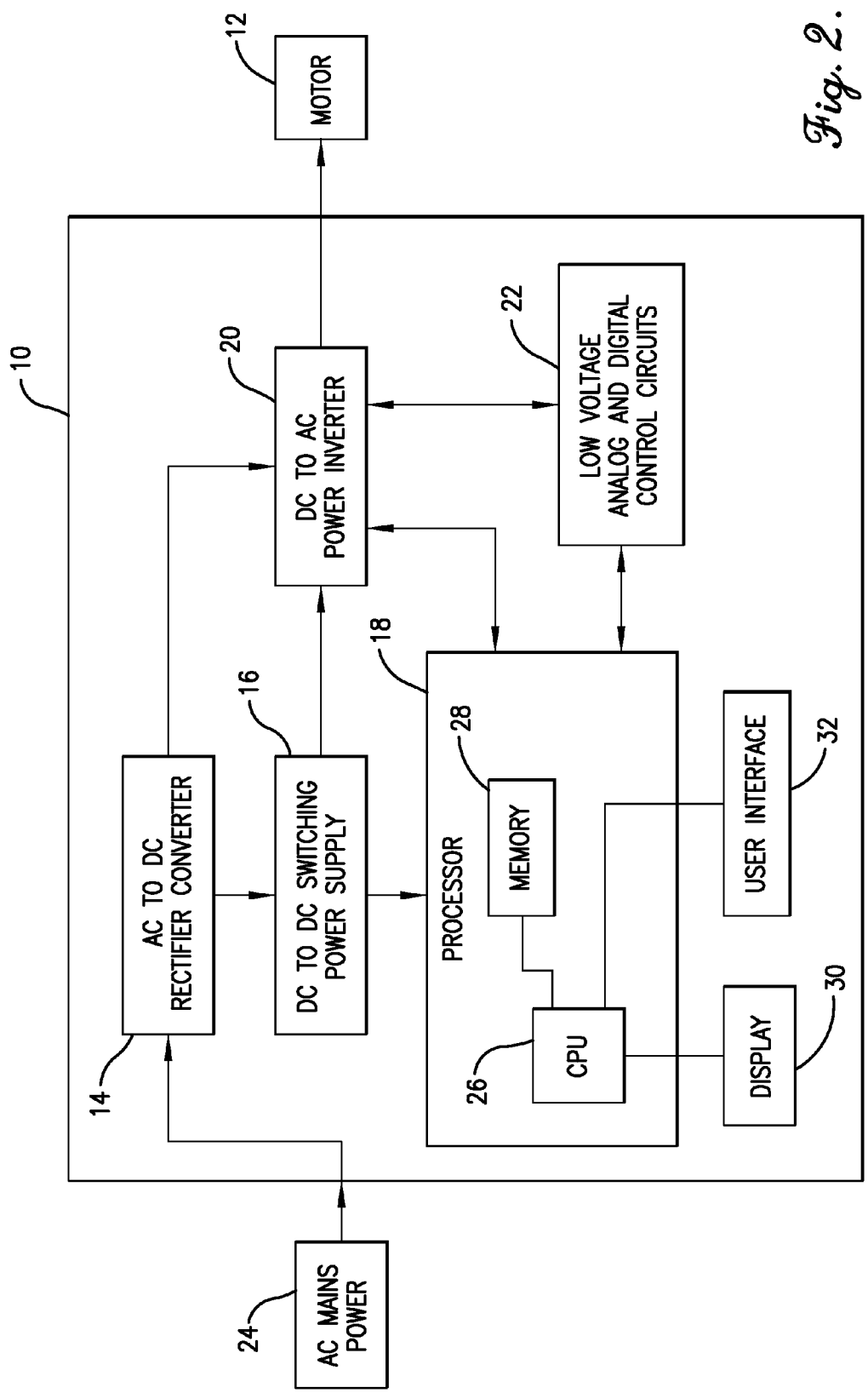
FIG. 2 is a schematic block diagram of the motor controller of FIG. 1.

As illustrated in FIG. 1, the present invention is a motor controller 10 designed for use with a three-phase motor 12. The three-phase motor 12 may be designed to drive air-moving blowers, fluid-moving pumps, or other devices using brushless permanent magnet motors. As illustrated in FIG. 2, the motor controller 10 may comprise an alternating current (AC) to direct current (DC) rectifier converter 14, a DC to DC switching power supply 16, a processor 18, a DC to AC power inverter 20, and low voltage analog and digital control circuits 22.

The AC to DC rectifier converter 14 may be configured for converting alternating current from a three-phase AC power source 24 into direct current used to power the three-phase motor 12. The DC to DC switching power supply 16 may be configured to convert a higher voltage DC power supply to a lower voltage DC power supply in order to power gate drive supply circuitry of the inverter 20, as well as power the processor 18, in addition to other lower voltage control circuitry of the motor controller 10.

The processor 18 may be a digital signal processor (DSP) having a central processing unit (CPU) 26 and memory elements 28 such as RAM, ROM, EEPROM, and the like. However, the processor 18 may be any computing device comprising any number or combination of controllers, circuits, integrated circuits, programmable logic devices such as programmable logic controllers (PLC) or motion programmable logic controllers (MPLC), computers, microprocessors, microcontrollers, transmitters, receivers, other electrical and computing devices, and/or residential or external memory for storing data and other information accessed and/or generated by the processor 18. In some embodiments of the invention, the motor controller 10 may also comprise a display 30 (e.g., a touch screen display) and/or a user interface 32 communicably coupled to the processor 18 for operation and input by a user.

The processor 18 may be configured to implement any combination of the algorithms, subroutines, or code corresponding to method steps and functions described herein. The processor 18 and computer programs described herein are merely examples of computer equipment and programs that may be used to implement the present invention and may be replaced with or supplemented with other controllers and computer programs without departing from the scope of the present invention. While certain features are described as residing in the processor, the invention is not so limited, and those features may be implemented elsewhere.

The processor 18 may implement a computer program and/or code segments to perform various steps of the method described herein as well as other functions and method steps described herein. The computer program may comprise an ordered listing of executable instructions for implementing logical functions in the processor 18. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

The residential or external memory 28 may be integral with the processor, stand-alone memory, or a combination of both. The memory 28 may include, for example, removable and non-removable memory elements such as RAM, ROM, flash, magnetic, optical, USB memory devices, MMC cards, RS MMC cards, SD cards such as microSD or miniSD, SIM cards, and/or other memory elements. Specifically, the memory 28 may store at least a portion of the computer program or code segments configured for performing methods and calculations described herein, as well as predetermined fundamental or carrier frequencies and PWM control information for the three-phase motor 12.

The display 30 may comprise a graphical interface operable to display visual graphics, images, text, etc. in response to external or internal processes and commands. For example, the display 30 may comprise conventional black and white, monochrome, or color display elements including CRT, TFT, LCD, and/or LED display devices. The display 30 may be integrated with the user interface 32, such as in embodiments where the display is a touch screen display to enable the player to interact with it by touching or pointing at display areas to provide information or selections to the processor 18. The display 30 may be coupled with the processor 18 and may be operable to display various information corresponding to the methods described herein, such as sensed or calculated currents for each phase, sample times for reading currents of the three phases, fundamental or carrier frequencies, various user-selectable parameters, etc.

The user interface 32 may enable one or more users or other devices to share information with the processor 18. The user interface 32 may comprise one or more functionable inputs such as buttons, switches, scroll wheels, a touch screen associated with the display (as noted above), voice recognition elements such as a microphone, pointing devices such as mice, touchpads, tracking balls, styluses, cameras such as a digital still or video camera, combinations thereof, etc. Further, the user interface 32 may comprise wired or wireless data transfer elements such as a removable memory, data transceivers, etc., to enable the user or other devices to remotely interface with the processor 18 or elements thereof. In some embodiments of the invention, the user interface 32 may also include a speaker for providing audible instructions and feedback.

In some embodiments of the invention, the user interface 32 may be configured to send application interface signals to an isolated interface circuit (not shown) of the motor controller 10. The isolated interface circuit may be configured to receive interface signals or commands from a user or another device via the user interface 32 and to provide those signals or commands to the processor, controlling various settings of the motor controller 10.

Figure 3:
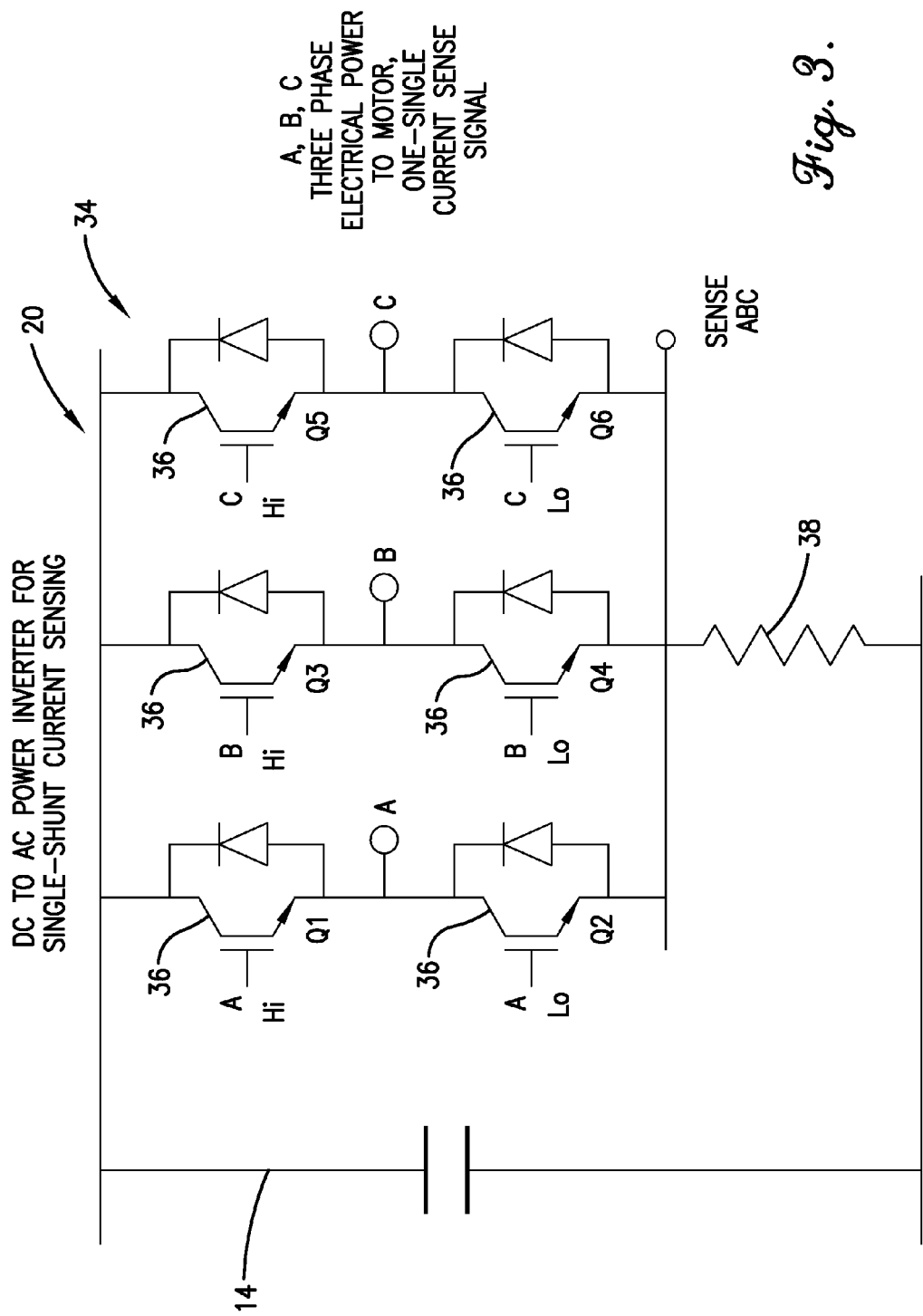
FIG. 3 is a schematic diagram of a DC to AC power inverter of the motor controller of FIG. 1, configured for providing a three-phase alternating current signal to the three-phase motor.

The DC to AC power inverter 20, as illustrated in FIG. 3, may comprise a switching array 34 including three phases, labeled A, B, and C herein, each having a pair of switching devices 36. The pair of switching devices 36 may include an upper switch and a lower switch. Specifically, phase A includes a pair of switching devices Q1 and Q2, phase B includes a pair of switching devices Q3 and Q4, and phase C includes a pair of switching devices Q5 and Q6 for supplying power to the respective phases of the motor 12. Each pair of switching devices 36 comprises an upper switch (i.e., Q1, Q3, Q5) and a lower switch (i.e., Q2, Q4, Q6). The switching devices 36 may include various switching devices known in the art, such as metal-oxide-semiconductor field-effect transistors (MOSFETs), insulated-gate bipolar transistors (IGBTs), bipolar junction transistors (BJTs), and the like. Generally either the upper or lower switch for a given phase is always on, except for brief periods during switching. The power inverter 20 converts direct current from the DC rectifier converter 14 into alternating current and provides the alternating current to the three-phase motor 12.

As illustrated in FIGS. 2 and 3, the low voltage analog and digital control circuits 22 may comprise a current sensor 38, also referred to herein as a single shunt. Additionally, the low voltage analog and digital control circuits 22 may comprise an amplifier and/or other various filtering circuitry known in the art. The current sensor 38 may be a shunt or other current-sensing device or circuit configured for measuring current that flows through a bus line from the rectifier converter 14 to the power inverter 20. The processor 18 may receive sensed current information from the current sensor 38 or single shunt to determine the current flowing through each individual phase of the power inverter 20.

Figure 4:
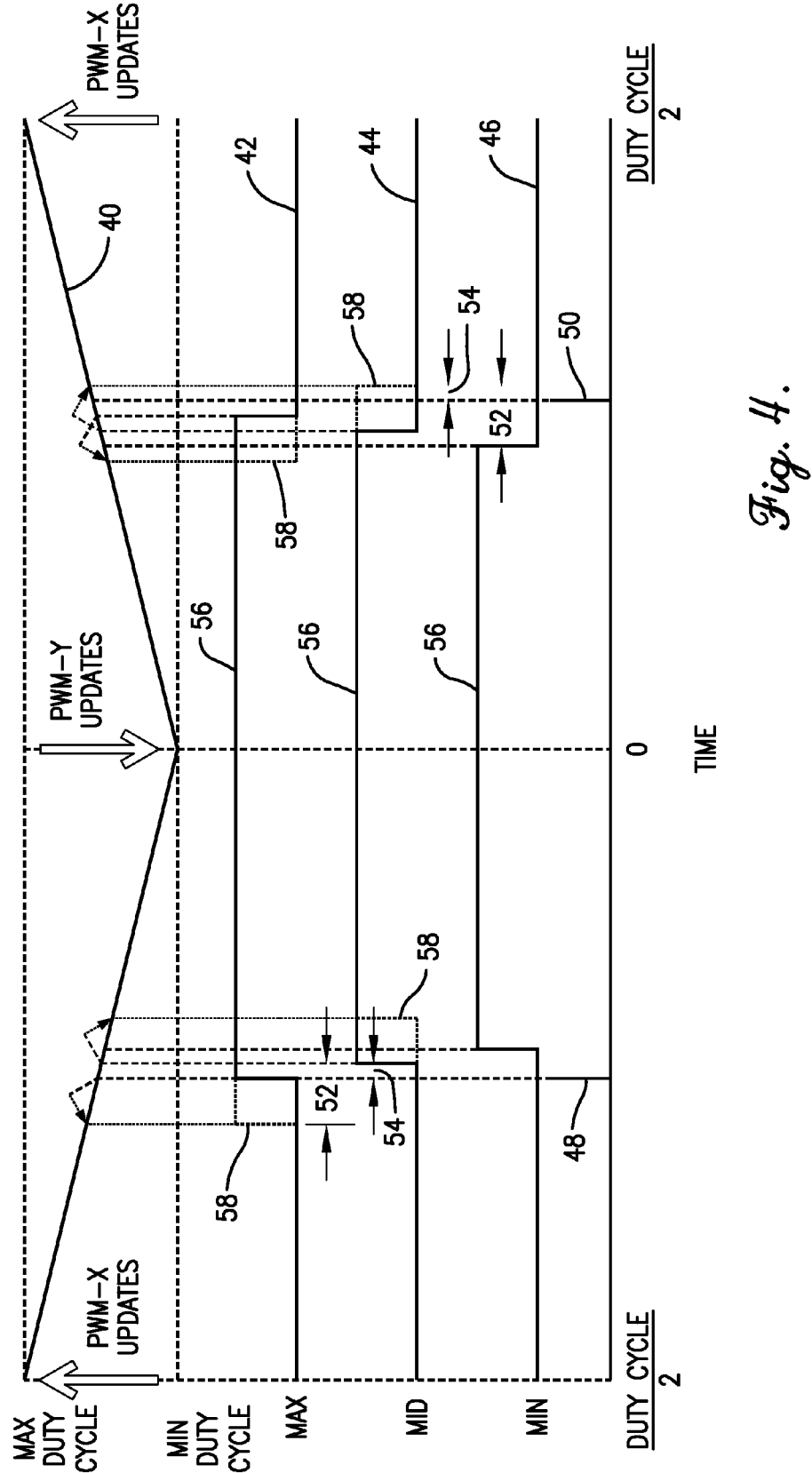
FIG. 4 is a graph illustrating a duty cycle in which pulses of all three phase signals of the AC to DC power inverter are too close together, time-wise, requiring shifting of two of the phase signals.
Figure 5:
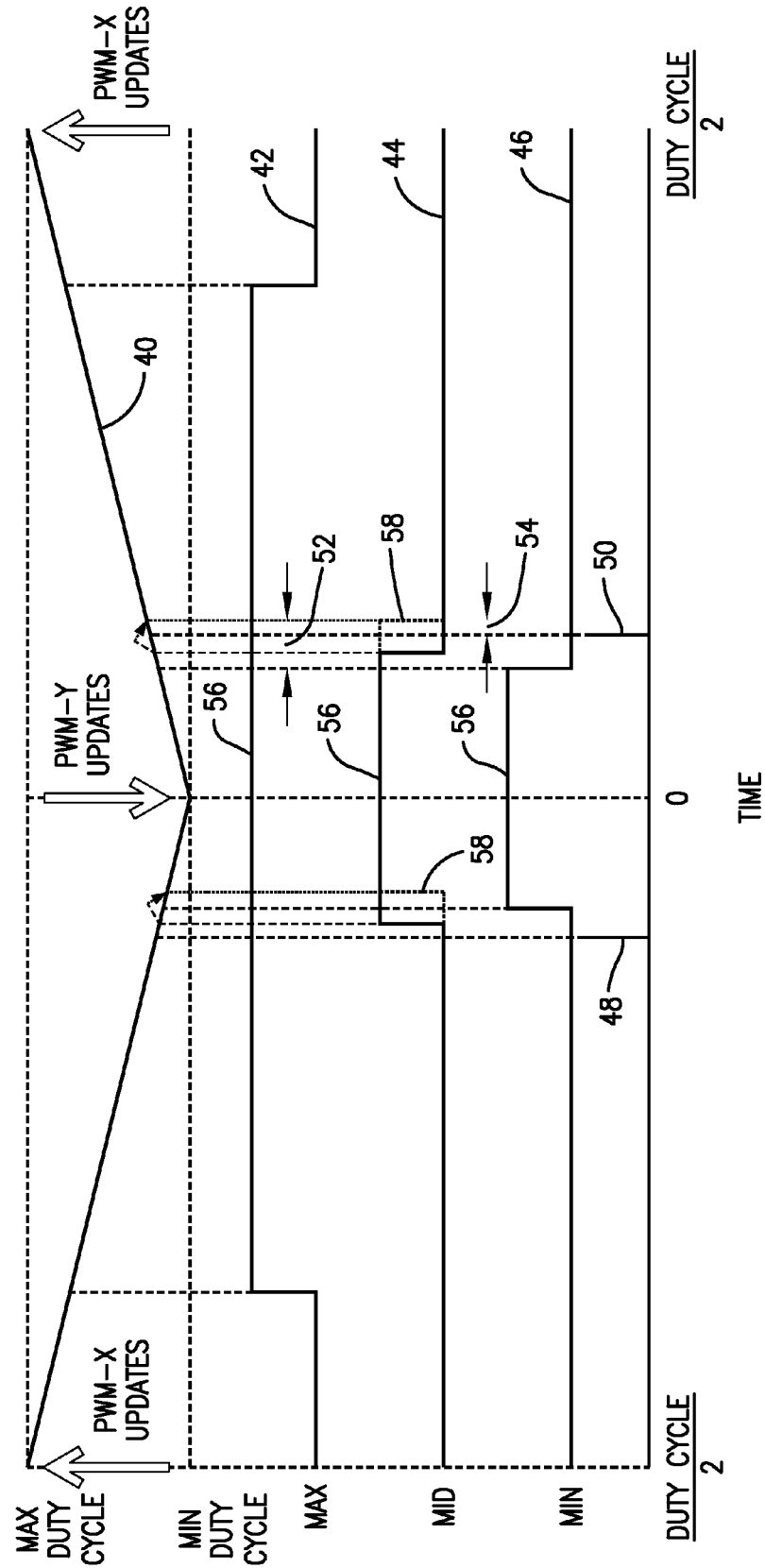
FIG. 5 is a graph illustrating a duty cycle in which pulses of minimum and middle phase signals of the AC to DC power inverter are too close together, time-wise, requiring shifting of the middle phase signal as illustrated.

In use, the processor 18 may control pulse-width modulation (PWM) of each of the three phases of the inverter 20 by controlling the timing of switching signals provided thereto, as illustrated in FIGS. 4-6. In some embodiments of the invention, the processor 18 may be configured to use feedback from the current sensor to control the PWM of the three phase signals. The PWM times or pulse width of each of the three phases varies according to a carrier frequency, also referred to herein as the motor's fundamental frequency. The carrier frequency is the same for all three phases, but shifted in time relative to each other (e.g., 60 or 120 degrees). The pulses of the three phases are substantially synchronized with each other such that their pulses' center points occur at identical points in time (except in the cases of minor shifting during some duty cycles, as described below). That is, for substantially simultaneously occurring pulses of the three phases sharing a center point in time, half a pulse occurs before the center point and half a pulse occurs after center point, even though the pulses of the three phases vary in duration from each other.

In FIGS. 4-6, reference numeral 40 represents output of an up/down counter, with updates occurring once every half duty cycle. The x-axis illustrates time according to the up/down counter, which counts down for half a duty cycle and then counts back up for a second half of the duty cycle. So in these example embodiments of the invention, the center point represents zero, with progressively larger counts left and right from that center point. The y-axis in FIGS. 4-6 corresponds to PWM duty cycle within the carrier frequency, which correlates to the motor phase currents. The pulses of the three phases are indicated by reference numerals 42, 44, and 46. Reference numerals 48 and 50 illustrate analog/digital (a/d) sample times, which are defined herein as points during the duty cycle when the current is sampled from the single shunt or current sensor 38.

The current sampled via the current sensor 28 (e.g., single shunt) by the processor 18 may correspond to currents of two of the phases, and then these two currents may be used to calculate the current of the third phase. For example, the current of the third phase may be calculated by adding the currents of the first and second phase together. Specifically, as illustrated in FIGS. 4-6, two samples may be taken from the current sensor per duty cycle, with the first sample occurring after the leading edge of a pulse of one phase but before the leading edges of the pulses of the other two phases. The second sample in that duty cycle may occur before the trailing edge of two of the phases.

At certain points during every cycle of the motor's fundamental frequency, two PWM times (i.e., pulse durations) are too close to obtain a clean sample of separate phase currents. At low speeds of approximately 15% and lower of the rated motor speed, all three of the PWM times may be too close to obtain a clean sample of separate phase currents. If the leading or trailing edges of the substantially simultaneously-occurring pulse occur too close in time to each other, one or both of the two samples for that duty cycle may be erroneous.

Thus, the processor 18 of the present invention is configured to shift the sample times (e.g., a/d sample times) and/or at least one of the three phases during duty cycles with PWM times too close together, thus ensuring that the current of the three phases can be accurately determined. In preferred embodiments of the present invention, this shifting is only performed as needed and only by the minimum amount needed, advantageously minimizing signal distortion. For example, for any given duty cycle, if a difference between leading edges of two or more of the phases' pulses or a difference between trailing edges of two or more of the phases' pulses is less than a predetermined minimum conflict time 52 for analog/digital (a/d) sampling of the phase current, one or more of the phases may be shifted in time. The minimum conflict time 52 may be stored in the memory 28 of the processor 18 or otherwise accessible by the processor 18 to perform some of the calculations and method steps described herein. The method may also include shifting one or more of the a/d sample times, which may be selected based on PWM times of one or more of the three phases.

The flow chart of FIG. 7 depicts the steps of an exemplary method 700 for determining current for three phases of a power inverter using a single current sensor. In some alternative implementations, the functions noted in the various blocks may occur out of the order depicted in FIG. 7. For example, two blocks shown in succession in FIG. 7 may in fact be executed substantially concurrently, or the blocks may sometimes be executed in the reverse order depending upon the functionality involved. The blocks shown in FIG. 7 may represent one or more code segments, algorithms, or calculations of the computer program described above and executable by the processor 18.

The method 700 may comprise the steps of determining the PWM time for each of the three phases for each duty cycle, as depicted in block 702, and determining which of the three phases has the maximum PWM time (i.e., the "maximum" phase), which of the three phases has the minimum PWM time (i.e., the "minimum" phase), and which of the three phases has the middle PWM time (i.e., the "middle" phase) with a PWM time somewhere between that of the maximum and minimum phases, as depicted in block 704. Note that, in FIGS. 4-6, a first phase 42 is the maximum phase, a second phase 44 is the middle phase, and a third phase 46 is the minimum phase. However, which phase is the maximum, middle, and minimum phase varies along with the carrier signals modulations, meaning that each of the phases will be the maximum, middle, and minimum phases at some point in time with respect to the motor's fundamental frequency. Furthermore, in FIGS. 4-6, the solid lines labeled with reference numeral 56 represent unshifted pulses for each of the phases 42-46, and the broken lines labeled with numeral 58 represent shifted pulses of one or more of the phases.

As illustrated in FIG. 4, the method 700 may include the step of determining if the PWM times of all three phases are too close, as depicted in block 706. As reference herein, the phases PWM times are "too close" if their difference or the distance between their leading or trailing edges is less than the minimum conflict time 52 for a/d sample of phase currents. If all three PWM times are too close, the method may next include the step of shifting two of the phases in time by an amount corresponding to the minimum conflict time 52 for a/d sampling of the phase current, as depicted in block 708. For example, the maximum phase may be shifted away from the middle phase (typically shift left) and the middle phase may be shifted away from the minimum phase (typically shift right). In an alternative embodiment of the invention, only the middle phase may be shifted forward in time by an amount such that the leading edges of the middle phase and the maximum phase pulses are at least the minimum conflict time 52 apart and the trailing edges of the minimum phase and middle phase are at least the minimum conflict time 52 apart. In this alternative embodiment of the invention, the a/d sample times would both be calculated based on the leading and trailing edges of the shifted middle phase pulse, as described further below.

The calculations for shifting the phases according to steps 706 and 708 above, and as illustrated in FIG. 4, may include the following:

$$\text{Max-}x\text{ shifted} = \text{Max-}x + (\min\text{-}ct - (\text{Max-}x - \text{Mid-}x))$$

$$\text{Max-}y\text{ shifted} = \text{Max-}y - (\min\text{-}ct - (\text{Max-}y - \text{Mid-}y))$$

$$\text{Mid-}x\text{ shifted} = \text{Mid-}x - (\min\text{-}ct - (\text{Mid-}x - \text{Min-}x))$$

$$\text{Mid-}y\text{ shifted} = \text{Mid-}y + (\min\text{-}ct - (\text{Mid-}y - \text{Min-}y))$$

Where Max, Mid, and Min represent leading or trailing pulse edges of the maximum, middle, and minimum phases, respectively, with the -x denoting a leading edge and the -y denoting a trailing edge. So, for example, Max-x denotes the leading edge of the pulse of the maximum phase and Max-y denotes the trailing edge of the pulse of the maximum phase. The shifted leading and trailing edges are solved for above. The variable min-ct represents the minimum conflict time 52.

The method 700 may include the step of determining if the PWM times of the minimum and middle phases are too close, as depicted in block 710. If the PWM times of the minimum and middle phases are too close, the method may next include the step of shifting the middle phase in time by an amount corresponding to the minimum conflict time 52 for a/d sampling of the phase current, as depicted in block 712. Specifically, the middle phase may be shifted in time away from the minimum phase's trailing edge (typically shift right).

The calculations for shifting the phases according to steps 710 and 712 above, and as illustrated in FIG. 5, may include the following:

$$\text{Mid-}x\text{ shifted} = \text{Mid-}x - (\min\text{-}ct - (\text{Mid-}x - \text{Min-}x))$$

$$\text{Mid-}y\text{ shifted} = \text{Mid-}y + (\min\text{-}ct - (\text{Mid-}y - \text{Min-}y)).$$

The method 700 may include the step of determining if the PWM times of the maximum and middle phases are too close, as depicted in block 714. If the PWM times of the maximum and middle phases are too close, the method may next include the step of shifting the middle phase in time by an amount corresponding to the minimum conflict time 52 for a/d sampling of the phase current, as depicted in block 716. Specifically, the middle phase may be shifted in time away from the maximum phase's leading edge (typically right).

The calculations for shifting the phases according to steps 714 and 716 above, and as illustrated in FIG. 6, may include the following:

$$\text{Mid-}x\text{ shifted} = \text{Mid-}x - (\min\text{-}ct - (\text{Max-}x - \text{Mid-}x))$$

$$\text{Mid-}y\text{ shifted} = \text{Mid-}y + (\min\text{-}ct - (\text{Max-}y - \text{Mid-}y))$$

The method 700 may further include the step of determining the a/d sample times 48,50 based on the middle phase pulse's leading and trailing edge times and a preselected time delay (td), as depicted in block 718 and reference numeral 54 in FIGS. 4-6. These calculations may depend on whether or not any shifting of the middle phase has occurred in the earlier method steps for a given duty cycle. For example, if none of the three phases have PWM times too close to each other, the following equations may be used to calculate the a/d sample times:

$$\text{first }a/d\text{ sample time} = \text{Mid-}x + td$$

$$\text{second }a/d\text{ sample time} = \text{Mid-}y - td$$

However, if PWM times of any of the three phases were determined to be too close to each other, requiring shifting of at least one of the phases, then at least one of the a/d sample times may also be shifted. Specifically, one of the a/d sample times calculated above may be shifted by an amount corresponding to the amount that the middle phase was shifted.

For example, if the minimum and middle phases had PWM times too close to each other, the second a/d sample time may be calculated based on the shifted middle phase pulse's trailing edge, as follows:

$$\text{second }a/d\text{ sample time} = \text{Mid-}y\text{ shifted} - td$$

The above equation may be used even if all three of the phrases had PWM times too close to each other, and the first a/d sample time may remain unchanged, as originally calculated above.

If the maximum and middle phases had PWM times too close to each other, the first a/d/sample time may be calculated based on the shifted middle phase pulse's leading edge, as follows:

$$\text{first }a/d\text{ sample time} = \text{Mid-}x\text{ shifted} + td$$

In the alternative embodiment of the invention described above where only the middle phase is shifted by an amount such that both the distance between the middle and maximum phases' leading edges and the distance between the middle and minimum phase's trailing edges equal the minimum conflict time 52, it may be necessary to shift only one or both the first and second a/d sample times during that duty cycle. For example, in this embodiment of the invention, the following equations for a/d sample times may be used based on the shifted leading and trailing edges of the middle phase pulse:

first a/d sample time=Mid-x shifted+td second a/d sample time=Mid-y shifted−td

Because the processor 18 controls the switching times and carrier frequency of the three-phase signal, it can anticipate where the PWM times will be too close to each other and make the adjustments described above in advance of output the signals. Thus, the pulses are output according to the shifting pre-calculated above and the processor 18 also samples these shifted phases at the a/d sample times pre-calculated above for each duty cycle.

Finally, the method 700 may include a step of reconstructing two of the phase signal currents from current sensed at the sample times and using those values to calculate the current of the remaining one of the three phase signals, as depicted in block 720. Sampling current over the single-shunt current sensor twice per duty cycle may provide values for determining two phase currents. For a balanced three-phase motor, the current in the three phases add up to zero. Thus, the remaining current can be calculated as follows:

$$iMax+iMid+iMin=0,$$

$$iMin=-iMax-iMid,$$

where iMax, iMid, and iMin correspond to the current of the maximum phase's pulse, the current of the middle phase's pulse, and the current of the minimum phase's pulse, respectively, for any given duty cycle. The processor 18 monitors the actual currents of the three phases to ensure that the multiple motor fundamental phase voltages and phase currents with respect to the amplitude and frequency of operation correspond to the application demand of motor speed, motor torque, blower air-flow, or pump fluid-flow, etc. in order to operate and control the blower, fan, pump, or other application load or device properly as intended. If the currents are outside of the intended operation of the application load, then the processor 18 may self-adjust accordingly to achieve proper intended operation, or an alarm, warning, or fault may occur.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A motor controller for a three-phase motor, the motor controller comprising:
   a three-phase DC to AC power inverter configured for providing three separate pulse width modulated (PWM) phase signals for powering the three-phase motor, wherein the phase signals have pulses of varying widths centered at identical points in each duty cycle, the pulses having leading edges and trailing edges;
   a current sensor coupled in series with the inverter and configured to receive current from the three phase signals simultaneously; and
   a processor configured for:
   controlling pulse-width modulation of the three phase signals of the power inverter;
   when a pulse width difference between simultaneously occurring pulses of at least two of the phase signals are less than a preselected minimum conflict time, shifting at least one of the phase signals in time such that a difference between leading edges or trailing edges of the pulses are equal to the preselected minimum conflict time;
   shifting two of the phase signals in time cycle when leading or trailing edges of pulses for all three phase signals in any duty cycle are less than the preselected minimum conflict time, wherein one of the phase signals is shifted a first direction in time and another one of the phase signals is shifted a second direction in time, wherein the second direction is opposite the first direction;
   detecting current from the current sensor at sample times a preselected delay time before the leading edge and before the trailing edge of one of the pulses; and
   shifting at least one of the sample times according to an amount or amounts by which the at least one of the phase signals are shifted.

2. The motor controller of claim 1, the processor further configured for: determining currents of a first one and second one of the three phase signals at the sample times; and calculating a current of a third one of the three phase signals using the determined currents of the first and second ones of the three phase signals.

3. The motor controller of claim 1, wherein the processor is further configured for determining or tracking which of the three PWM phase signals is ranked maximum, minimum, and middle in respect to pulse duration or pulse width for any single duty cycle.

4. The motor controller of claim 3, wherein at least the middle one of the three phase signals is shifted.

5. The motor controller of claim 3, wherein the sample times are the preselected delay time before the leading and trailing edges of the middle one of the three phase signals before or after the middle one of the three phase signals is shifted.

6. The motor controller of claim 1, further comprising an AC to DC rectifier configured for converting alternating current from an AC power source into a substantially direct current and providing the direct current to the DC to AC power inverter.

7. A motor controller for a three-phase motor, the motor controller comprising:
   a three-phase DC to AC power inverter configured for providing three separate pulse width modulated (PWM) phase signals for powering the three-phase motor, wherein the phase signals have pulses of differing widths centered at identical points in each duty cycle, the pulses having leading edges and trailing edges;
   a single-shunt current sensor coupled in series with the inverter and configured to receive current from the three phase signals simultaneously; and
   a processor configured for:
   controlling pulse-width modulation of the three phase signals,
   determining or tracking which of the three phase signals has a maximum, minimum, and middle pulse duration or pulse width for any single duty cycle, thereby identifying a maximum phase signal, a minimum phase signal, and a middle phase signal, respectively,
   determining if at least two of the phase signals have leading or trailing edges less than a preselected minimum conflict time away from each other,
   when at least two of the phase signals have leading or trailing edges less than a preselected minimum conflict time away from each other, shifting the middle phase signal in time such that a difference between the leading edges or trailing edges of the at least two of the phase signals are equal to the preselected minimum conflict time, shifting at least one of the phase signals by an amount equal to the preselected minimum conflict time minus the difference between the leading or trailing edges of two of the phase signals that are less than the preselected minimum conflict time away from each other, and sampling current from the single-shunt current sensor at sample times a preselected delay time ahead of the leading edge and ahead of the trailing edge of the middle phase signal, at least one of before and after the middle phase signal is shifted.

8. The motor controller of claim 7, the processor further configured for: determining currents of the maximum and middle phase signals at the sample times, and calculating a current of the minimum phase signal using the determined currents of the maximum and middle phase signals; or determining currents of the minimum and middle phase signals at the sample times, and calculating a current of the maximum phase signal using the determined currents of the minimum and middle phase signals.

9. A motor controller for a three-phase motor, the motor controller comprising:

a three-phase DC to AC power inverter configured for providing three separate pulse width modulated (PWM) phase signals for powering the three-phase motor, wherein the phase signals have pulses of differing widths centered at identical points in each duty cycle, the pulses having leading edges and trailing edges;

a single-shunt current sensor coupled in series with the inverter and configured to receive current from the three phase signals simultaneously; and a processor configured for:
controlling pulse-width modulation of the three phase signals,
determining or tracking which of the three phase signals has a maximum, minimum, and middle pulse duration or pulse width for any single duty cycle, thereby identifying a maximum phase signal, a minimum phase signal, and a middle phase signal, respectively,
determining if at least two of the phase signals have leading or trailing edges less than a preselected minimum conflict time away from each other,
when at least two of the phase signals have leading or trailing edges less than a preselected minimum conflict time away from each other, shifting the middle phase signal in time such that a difference between the leading edges or trailing edges of the at least two of the phase signals are equal to the preselected minimum conflict time,
shifting two of the phase signals in time during duty cycles when leading or trailing edges of all three of the phase signals are less than the preselected minimum conflict time, wherein the maximum phase signal is shifted a first direction in time and the middle phase signal is shifted a second direction in time, wherein the second direction is opposite the first direction, and
sampling current from the single-shunt current sensor at sample times a preselected delay time ahead of the leading edge and ahead of the trailing edge of the middle phase signal, at least one of before and after the middle phase signal is shifted.

10. A motor controller for a three-phase motor, the motor controller comprising:

a three-phase DC to AC power inverter configured for providing three separate pulse width modulated (PWM) phase signals for powering the three-phase motor, wherein the phase signals have pulses of differing widths centered at identical points in each duty cycle, the pulses having leading edges and trailing edges;

a single-shunt current sensor coupled in series with the inverter and configured to receive current from the three phase signals simultaneously; and a processor configured for:
controlling pulse-width modulation of the three phase signals,
determining or tracking which of the three phase signals has a maximum, minimum, and middle pulse duration or pulse width for any single duty cycle, thereby identifying a maximum phase signal, a minimum phase signal, and a middle phase signal, respectively,
determining if at least two of the phase signals have leading or trailing edges less than a preselected minimum conflict time away from each other,
when at least two of the phase signals have leading or trailing edges less than a preselected minimum conflict time away from each other, shifting the middle phase signal in time such that a difference between the leading edges or trailing edges of the at least two of the phase signals are equal to the preselected minimum conflict time, and
sampling current from the single-shunt current sensor at sample times a preselected delay time ahead of the leading edge and ahead of the trailing edge of the middle phase signal, at least one of before and after the middle phase signal is shifted,
wherein the sample times include a first sample time and a second sample time, wherein, when the maximum and middle phase signals are less than the preselected minimum conflict time away from each other, the first sample time is the preselected delay time ahead of the leading edge of the middle phase signal, shifted, and the second sample time is the preselected delay time ahead of the trailing edge of the middle phase signal, unshifted.

11. A motor controller for a three-phase motor, the motor controller comprising:

a three-phase DC to AC power inverter configured for providing three separate pulse width modulated (PWM) phase signals for powering the three-phase motor, wherein the phase signals have pulses of differing widths centered at identical points in each duty cycle, the pulses having leading edges and trailing edges;

a single-shunt current sensor coupled in series with the inverter and configured to receive current from the three phase signals simultaneously; and a processor configured for:
controlling pulse-width modulation of the three phase signals,
determining or tracking which of the three phase signals has a maximum, minimum, and middle pulse duration or pulse width for any single duty cycle, thereby identifying a maximum phase signal, a minimum phase signal, and a middle phase signal, respectively,
determining if at least two of the phase signals have leading or trailing edges less than a preselected minimum conflict time away from each other,
when at least two of the phase signals have leading or trailing edges less than a preselected minimum conflict time away from each other, shifting the middle phase signal in time such that a difference between the leading edges or trailing edges of the at least two of the phase signals are equal to the preselected minimum conflict time, and sampling current from the single-shunt current sensor at sample times a preselected delay time ahead of the leading edge and ahead of the trailing edge of the middle phase signal, at least one of before and after the middle phase signal is shifted, wherein the sample times include a first sample time and a second sample time, wherein, when the middle and minimum ones of the phase signals are less than the preselected minimum conflict time away from each other, the first sample time is the preselected delay time ahead of the leading edge of the middle phase signal, unshifted, and the second sample time is the preselected delay time ahead of the trailing edge of the middle phase signal, shifted.

12. A motor controller for a three-phase motor, the motor controller comprising:

a three-phase DC to AC power inverter configured for providing three separate pulse width modulated (PWM) phase signals for powering the three-phase motor, wherein the phase signals have pulses of differing widths centered at identical points in each duty cycle, the pulses having leading edges and trailing edges;

a single-shunt current sensor coupled in series with the inverter and configured to receive current from the three phase signals simultaneously; and a processor configured for:

controlling pulse-width modulation of the three phase signals, determining or tracking which of the three phase signals has a maximum, minimum, and middle pulse duration or pulse width for any single duty cycle, thereby identifying a maximum phase signal, a minimum phase signal, and a middle phase signal, respectively, determining if at least two of the phase signals have leading or trailing edges less than a preselected minimum conflict time away from each other, when at least two of the phase signals have leading or trailing edges less than a preselected minimum conflict time away from each other, shifting the middle phase signal in time such that a difference between the leading edges or trailing edges of the at least two of the phase signals are equal to the preselected minimum conflict time, and sampling current from the single-shunt current sensor at sample times a preselected delay time ahead of the leading edge and ahead of the trailing edge of the middle phase signal, at least one of before and after the middle phase signal is shifted, wherein the sample times include a first sample time and a second sample time, wherein the first sample time is after the leading edge of the maximum phase signal and before the leading edges of the middle and minimum phase signals, wherein the second sample time is after the trailing edge of the minimum phase signal and before the trailing edges of the middle and maximum phase signals.

13. A motor controller for a three-phase motor, the motor controller comprising:

a three-phase DC to AC power inverter configured for providing three separate pulse width modulated (PWM) phase signals for powering the three-phase motor, wherein the phase signals have pulses of differing widths centered at identical points in each duty cycle, the pulses having leading edges and trailing edges;

a single-shunt current sensor coupled in series with the inverter and configured to receive current from the three phase signals simultaneously; and a processor configured for:

controlling pulse-width modulation of the three phase signals of the power inverter according to a selected fundamental frequency and feedback from the single-shunt current sensor;

determining or tracking which of the three PWM phase signals is maximum phase signal, minimum phase signal, and middle phase signal for any given duty cycle, wherein the maximum phase signal has a greater pulse width than the middle and minimum phase signals, the minimum phase signal has a smaller pulse width than the maximum and middle phase signals, and the middle phase signal has a pulse width greater than that of the minimum phase signal but less than that of the maximum phase signal;

determining if at least two of the phase signals have leading or trailing edges less than a preselected minimum conflict time away from each other;

when at least two of the phase signals have leading or trailing edges less than a preselected minimum conflict time away from each other, shifting the middle phase signal in time by an amount equal to the preselected minimum conflict time minus the difference between the leading or trailing edges of two of the phase signals that are less than the preselected minimum conflict time away from each other;

shifting two of the phase signals in time during duty cycles when leading or trailing edges of all three of the phase signals are less than the preselected minimum conflict time, wherein the maximum one of the phase signals is shifted a first direction in time and the middle one of the phase signals is shifted a second direction in time, wherein the second direction is opposite the first direction; and sampling current from the single-shunt current sensor at sample times a preselected delay time before the leading edge and before the trailing edge of the shifted or unshifted middle phase signal.

14. The motor controller of claim 13, the processor further configured for: determining currents of the maximum and middle phase signals at the sample times, and calculating a current of the minimum phase signal using the determined currents of the maximum and middle phase signals; or determining currents of the minimum and middle phase signals at the sample times, and calculating a current of the maximum phase signal using the determined currents of the minimum and middle phase signals.

15. A motor controller for a three-phase motor, the motor controller comprising:

a three-phase DC to AC power inverter configured for providing three separate pulse width modulated (PWM) phase signals for powering the three-phase motor, wherein the phase signals have pulses of differing widths centered at identical points in each duty cycle, the pulses having leading edges and trailing edges;

a single-shunt current sensor coupled in series with the inverter and configured to receive current from the three phase signals simultaneously; and a processor configured for:

controlling pulse-width modulation of the three phase signals of the power inverter according to a selected fundamental frequency and feedback from the single-shunt current sensor;

determining or tracking which of the three PWM phase signals is maximum phase signal, minimum phase signal, and middle phase signal for any given duty cycle, wherein the maximum phase signal has a greater pulse width than the middle and minimum phase signals, the minimum phase signal has a smaller pulse width than the maximum and middle phase signals, and the middle phase signal has a pulse width greater than that of the minimum phase signal but less than that of the maximum phase signal;

determining if at least two of the phase signals have leading or trailing edges less than a preselected minimum conflict time away from each other;

when at least two of the phase signals have leading or trailing edges less than a preselected minimum conflict time away from each other, shifting the middle phase signal in time by an amount equal to the preselected minimum conflict time minus the difference between the leading or trailing edges of two of the phase signals that are less than the preselected minimum conflict time away from each other; and sampling current from the single-shunt current sensor at sample times a preselected delay time before the leading edge and before the trailing edge of the shifted or unshifted middle phase signal, wherein the sample times include a first sample time and a second sample time, wherein the first sample time is the preselected delay time before the leading edge of the shifted middle phase signal and the second sample time is the preselected delay time before the trailing edge of the unshifted middle phase signal when the maximum and middle phase signals are less than the preselected minimum conflict time away from each other.

16. A motor controller for a three-phase motor, the motor controller comprising:

a three-phase DC to AC power inverter configured for providing three separate pulse width modulated (PWM) phase signals for powering the three-phase motor, wherein the phase signals have pulses of differing widths centered at identical points in each duty cycle, the pulses having leading edges and trailing edges;

a single-shunt current sensor coupled in series with the inverter and configured to receive current from the three phase signals simultaneously; and a processor configured for:
 controlling pulse-width modulation of the three phase signals of the power inverter according to a selected fundamental frequency and feedback from the single-shunt current sensor;
 determining or tracking which of the three PWM phase signals is maximum phase signal, minimum phase signal, and middle phase signal for any given duty cycle, wherein the maximum phase signal has a greater pulse width than the middle and minimum phase signals, the minimum phase signal has a smaller pulse width than the maximum and middle phase signals, and the middle phase signal has a pulse width greater than that of the minimum phase signal but less than that of the maximum phase signal;
 determining if at least two of the phase signals have leading or trailing edges less than a preselected minimum conflict time away from each other;
 when at least two of the phase signals have leading or trailing edges less than a preselected minimum conflict time away from each other, shifting the middle phase signal in time by an amount equal to the preselected minimum conflict time minus the difference between the leading or trailing edges of two of the phase signals that are less than the preselected minimum conflict time away from each other; and
 sampling current from the single-shunt current sensor at sample times a preselected delay time before the leading edge and before the trailing edge of the shifted or unshifted middle phase signal,
 wherein the sample times include a first sample time and a second sample time, wherein the first sample time is the preselected delay time before the leading edge of the unshifted middle phase signal and the second sample time is the preselected delay time before the trailing edge of the shifted middle phase signal when the middle and minimum phase signals are less than the preselected minimum conflict time away from each other.

17. A motor controller for a three-phase motor, the motor controller comprising:

a three-phase DC to AC power inverter configured for providing three separate pulse width modulated (PWM) phase signals for powering the three-phase motor, wherein the phase signals have pulses of differing widths centered at identical points in each duty cycle, the pulses having leading edges and trailing edges;

a single-shunt current sensor coupled in series with the inverter and configured to receive current from the three phase signals simultaneously; and a processor configured for:
 controlling pulse-width modulation of the three phase signals of the power inverter according to a selected fundamental frequency and feedback from the single-shunt current sensor;
 determining or tracking which of the three PWM phase signals is maximum phase signal, minimum phase signal, and middle phase signal for any given duty cycle, wherein the maximum phase signal has a greater pulse width than the middle and minimum phase signals, the minimum phase signal has a smaller pulse width than the maximum and middle phase signals, and the middle phase signal has a pulse width greater than that of the minimum phase signal but less than that of the maximum phase signal;
 determining if at least two of the phase signals have leading or trailing edges less than a preselected minimum conflict time away from each other;
 when at least two of the phase signals have leading or trailing edges less than a preselected minimum conflict time away from each other, shifting the middle phase signal in time by an amount equal to the preselected minimum conflict time minus the difference between the leading or trailing edges of two of the phase signals that are less than the preselected minimum conflict time away from each other; and
 sampling current from the single-shunt current sensor at sample times a preselected delay time before the leading edge and before the trailing edge of the shifted or unshifted middle phase signal,
 wherein the sample times include a first sample time and a second sample time, wherein the first sample time is after the leading edge of the maximum phase signal and before the leading edges of the middle and minimum phase signals, wherein the second sample time is after the trailing edge of the minimum phase signal and before the trailing edges of the middle and maximum phase signals.

* * * * *